United States Patent
Lee (10) Patent No.: US 10,174,210 B2
(45) Date of Patent: Jan. 8, 2019

(54) METHOD OF FABRICATING HIGH-CONDUCTIVITY THICK-FILM ALUMINUM PASTE

(71) Applicant: National Cheng Kung University, Tainan (TW)

(72) Inventor: Wen-Hsi Lee, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 54 days.

(21) Appl. No.: 14/969,541

(22) Filed: Dec. 15, 2015

(65) Prior Publication Data
US 2017/0166759 A1    Jun. 15, 2017

(51) Int. Cl.
| | | |
|---|---|---|
| H01B 1/02 | (2006.01) | |
| C09D 5/24 | (2006.01) | |
| H01B 1/16 | (2006.01) | |

(52) U.S. Cl.
CPC .............. C09D 5/24 (2013.01); H01B 1/16 (2013.01)

(58) Field of Classification Search
CPC ..................................... H01B 1/22; H01B 1/16
USPC ................................. 136/256; 252/512–514
See application file for complete search history.

(56) References Cited

U.S. PATENT DOCUMENTS

2012/0325307 A1* 12/2012 Li ........................... H01B 1/22
                                                                 136/256

FOREIGN PATENT DOCUMENTS

| CN | 101304049 | | 11/2008 | |
|---|---|---|---|---|
| CN | 102971803 A | * | 3/2013 | ............ H01B 1/16 |
| JP | 2014-167914 | | 9/2014 | |
| TW | 201517057 | | 5/2015 | |
| WO | WO 2011-046360 A2 | * | 4/2011 | ........... H01L 31/042 |

* cited by examiner

*Primary Examiner* — Khanh T Nguyen
(74) *Attorney, Agent, or Firm* — Jackson IPG PLLC; Demian K. Jackson (57) ABSTRACT

The present invention provides an aluminum (Al) paste. The Al paste has low cost and high conductivity. An Al powder having a wide range of particle size distribution and an increased solid content are used to solve the problem of multiple pores. A rupture mechanism of alumina is fully used for sintering to improve contacting internal liquid Al with each other for forming conductive paths. With coordination of sufficient liquid glass powder, all ruptured surface of the Al powder is coated to inhibit exposed liquid Al from oxidation on contacting air. The problem of low conductivity of Al paste is thus radically solved.

3 Claims, 13 Drawing Sheets

| Chip resistor | Ag terminal electrode 200Ω | Al terminal electrode 200Ω |
|---|---|---|
| 1 | 1.1 | -0.03 |
| 2 | ---- | -0.04 |
| 3 | 2.3 | -0.03 |
| 4 | ---- | -0.02 |
| 5 | -0.5 | -0.03 |
| 6 | 1.7 | -0.04 |
| 7 | ----- | -0.03 |
| 8 | ------ | 0.00 |
| 9 | 2.1 | -0.03 |
| 10 | ----- | -0.03 |

METHOD OF FABRICATING HIGH-CONDUCTIVITY THICK-FILM ALUMINUM PASTE

TECHNICAL FIELD OF THE INVENTION

The present invention relates to thick-film aluminum (Al) paste; more particularly, relates to providing a high-conductivity and low-cost thick-film Al paste for being sintered in the air, where the present invention can widely replace traditional high-cost Al paste and the copper paste which needs to be sintered in a reducing atmosphere.

DESCRIPTION OF THE RELATED ARTS

Figure 9:
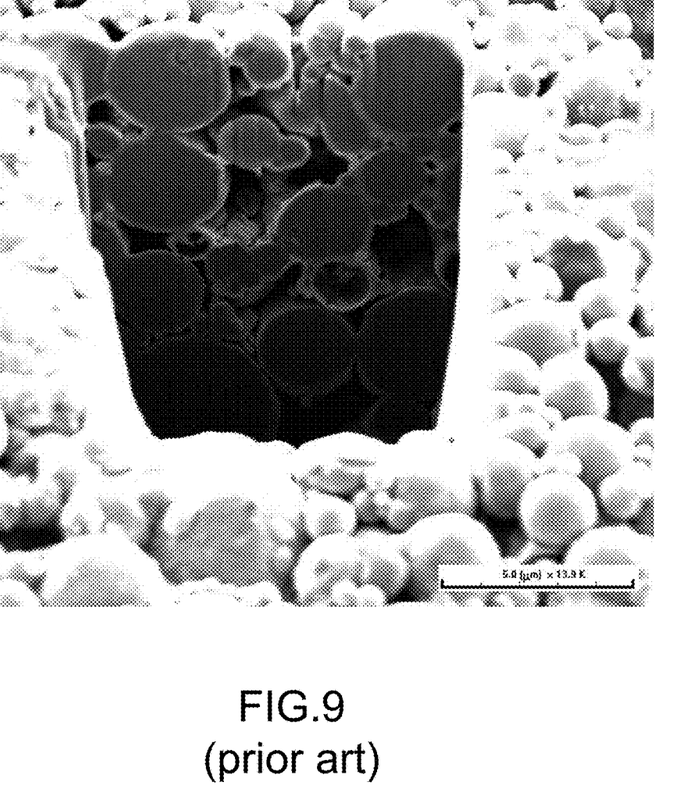
FIG. 9 is the structural view of the thick-film Al paste of the prior art.

Terminal electrode of thick-film resistor can be divided into three categories, including front-terminal electrode, side-terminal electrode and back-terminal electrode. Therein, the side-terminal electrode and the back-terminal electrode are used for the plating nickel and the tin seed layer in the post process. The front-terminal electrode is not only used for the plating nickel and the tin seed layer in the post process; but also is responsible for connecting path of conducting the resistor layer. Therefore, the conductivity of the front-terminal electrode must be far lower than that of the resistor layer for forming ohm contact. For now, conductive paste used for the terminal electrodes in the market is mainly silver paste, which is the most mature technology and is also the most widely used conductive thick-film paste with high conductivity to be sintered in the air. But, its cost is expensive, and, following the continuing rise of the international silver price, the price of silver powder remains high. With the consideration of cost, some applications slowly turn to use lower-cost copper as a metal filler. Yet, because copper is easily oxidized and must be sintered in a reducing atmosphere with an expensive sintering furnace, the application of copper paste is still limited. Meanwhile, Al paste has advantages of low cost and being sintered in the air; but the resistivity of commercially available Al paste is often too high. The main reason for the low conductivity of the conventional Al paste is rendered as that the Al surface will naturally generate a thin layer of Al oxide to prevent continuous internal oxidization in the air; and this oxidized layer blocks the access to the internal Al and inhibits Al contraction during sintering as well. Yet, as a result, defects of multiple pores and Al shells are formed after sintering and cause high resistivity, where the micro-structure is shown in FIG. 9. As the figure shows, the traditional Al paste obviously has the defects of multiple pores and Al shells.

Furthermore, general conductive silver paste or copper paste will face a serious problem on processes of filling pores and metallization of the substrate. The size of the general conductive silver paste or copper paste becomes smaller after sintering owing to shrinkage of the silver paste or copper paste. The problem is particularly serious for filling pores where gap might be left owing to that the pores are not fully filled by the paste. Conductivity or thermal behavior will be affected and leakage might happen on vacuum packaging.

Although the silver paste is expensive and the copper paste is relatively cheap, application of the copper paste is limited for it has to be sintered in a reducing atmosphere. Al has high conductivity and low cost and can be sintered in the air; but, when Al paste is made, it has no advantage on conductivity.

Hence, the prior arts do not fulfill all users' requests on actual use.

SUMMARY OF THE INVENTION

The main purpose of the present invention is to provide a high-conductivity and low-cost thick-film Al paste for being sintered in the air, where the present invention can widely replace traditional high-cost Al paste and the copper paste which needs to be sintered in a reducing atmosphere.

Another purpose of the present invention is to provide the high-conductivity thick-film Al paste to be applied to thick-film resistor terminal electrode and metallization of light-emitting diode (LED) ceramic substrate.

To achieve the above purposes, the present invention is a method of fabricating a high-conductivity thick-film aluminum (Al) paste, comprising steps of: (a) providing an Al powder having particles of different sizes, where the Al powder have a size ratio of big particle to small particle as 4±50% (percent):1±50%; (b) mixing the Al powder with a glass powder, where the Al powder has a solid content of 7.5 weight percents (wt %)±50% and a solid content ratio of the Al powder to the glass powder as 10:1; and (c) processing liquid-phase sintering to a mixture of the Al powder and the glass powder at a temperature of more than 500 celsius degrees (° C.), where, at the temperature, the Al powder uses a rupture mechanism of alumina on surface to coat all ruptured surface of the Al powder while exposed liquid Al is inhibited from oxidation with coordination of a liquid phase of the glass powder on contacting air; where adjacent parts of the exposed liquid Al are contacted with each other to form conductive paths; and where a dense and non-shrunk thick-film Al paste is obtained. Accordingly, a novel method of fabricating a high-conductivity thick-film Al paste is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1A:
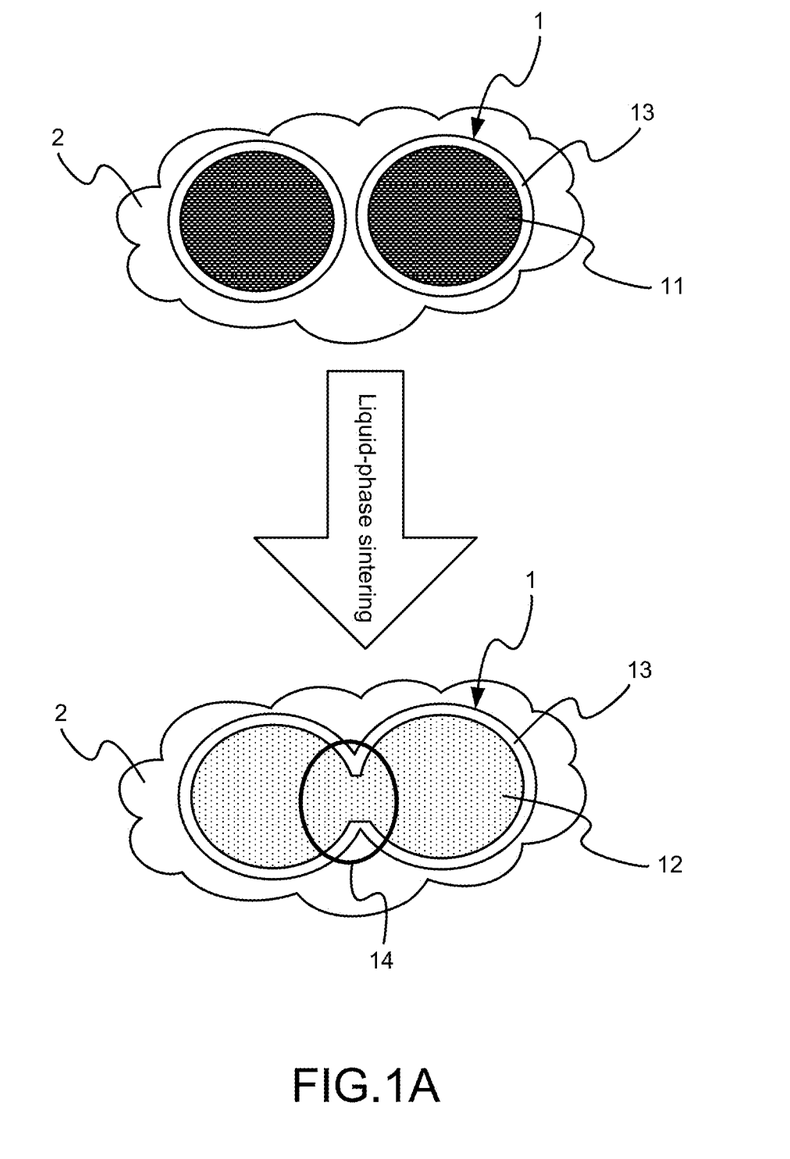
FIG. 1A is the view showing the preferred embodiment according to the present invention.
Figure 1B:
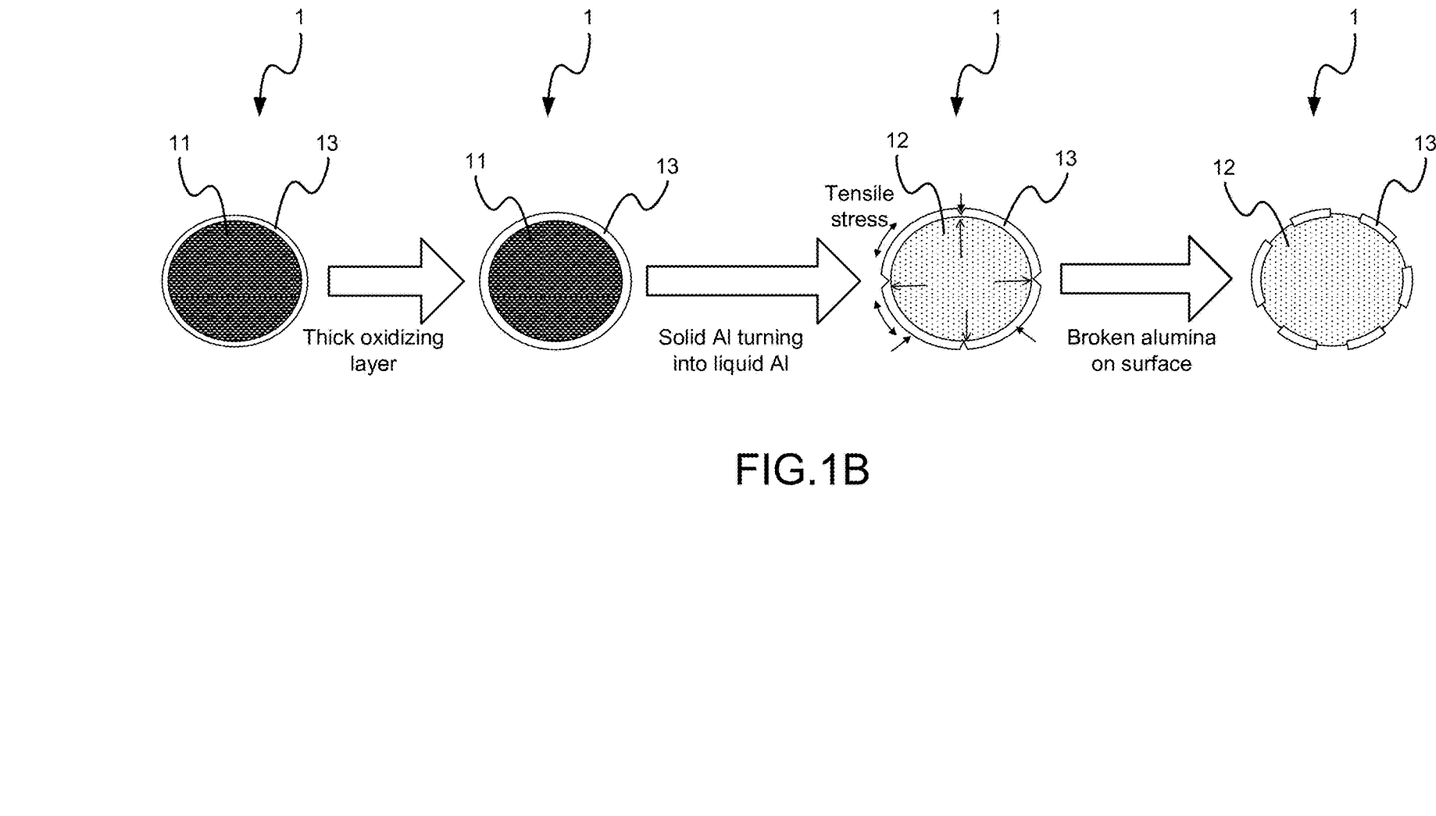
FIG. 1B is the view showing the alumina rupture mechanism.

Please refer to FIG. 1A-FIG. 8, which are a view showing a preferred embodiment according to the present invention; a view showing an alumina rupture mechanism; a view showing a state-of-use of the preferred embodiment; a view showing a thermal gravimetric analysis of big and small particles of an Al powder; a view showing surface microstructures of the big and small particles of the Al powder; a view showing microstructures of the particles of the Al powder having different size ratios; a view showing a thermal gravimetric analysis for being added with different amounts of glass; a view showing microstructures for being added with the different amounts of glass; a view showing microstructures for matching and mismatching ratios of the Al powder and the glass powder; a view showing microstructures of a conventional Al paste and a novel Al paste fabricated according to the present invention; a view showing reliability of electrodes at thick-film resistor side to be applied with the novel Al paste in sulfide tests; a structural view showing applications to pore filling and metallization of a LED ceramic substrate. As shown in the figures, the present invention is a method of fabricating a high-conductivity thick-film Al paste, comprising the following steps:

(a) As shown in FIG. 1A, an Al powder 1 having particles of different sizes is provided, where the Al powder have a size ratio of big particle to small particle as 4±50% (percent):1±50%; and the Al powder has a big particle size controlled at 4~6 micro-meters (μm) and a small particle size controlled at 1~3 μm.

(b) The Al powder 1 is mixed with a glass powder 2, where the Al powder has a solid content of 7.5 weight percents (wt %)±50% and a solid content ratio of the Al powder to the glass powder as 10:1.

(c) The mixture of the Al powder 1 and the glass powder 2 is processed through liquid-phase sintering at a temperature of more than 500 celsius degrees (° C.). At the temperature, the Al powder 1 is turned from a solid Al 11 into a liquid Al 12. A rupture mechanism of alumina on surface is used to coat all ruptured surfaces of the Al powder 1 while exposed liquid Al 12 is inhibited from oxidation with coordination of a liquid phase of the glass powder 2 on contacting air. Adjacent parts of the exposed liquid Al are further contacted with each other to form conductive paths. A dense and non-shrunk thick-film Al paste is obtained.

Thus, a novel method of fabricating a high-conductivity thick-film Al paste is obtained.

Figure 1C:
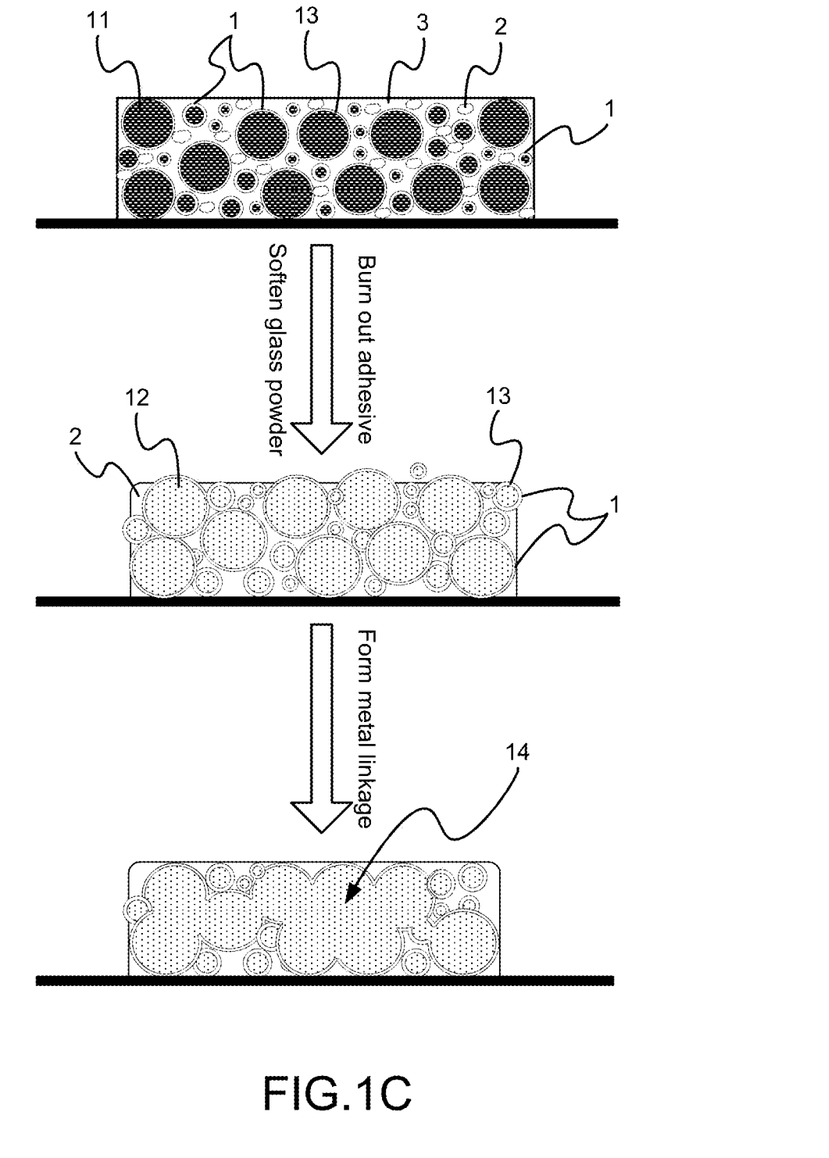
FIG. 1C is the view showing the state-of-use of the preferred embodiment.

Traditional Al paste has structural defects, including multiple pores and Al shells (as shown in FIG. 9). The problem of pores can be solved by stacking different sizes of particles and increasing solid content. The problem of Al shells comes from sintering procedure. When the sintering temperature exceeds Al melting point (660° C.), the Al inside is melted and expanded. Because of the difference in expansion coefficient, the alumina on surface is ruptured. Thus, the Al melted inside flows out and is immediately oxidized to form the Al shells. On using the present invention, as shown in FIG. 1C, the mixture of the Al powder 1 and the glass powder 2 is further mixed with an adhesive 3 for forming a paste to be printed on a substrate for sintering. The adhesive 3 is burnt out and the glass powder 2 is softened to become a liquid-phase glass powder 2. With the rupture mechanism of the alumina 13 on surface used, an enough amount of the glass powder 2 is coordinated to inhibit exposed part of liquid Al 12 from oxidation on contacting air. The adjacent parts of the liquid Al 12 are further contacted with each other to form conductive paths. Consequently, the present invention increases solid content to achieve high conductivity and low cost while the thick-film conductive Al paste can be sintered in the air.

Figure 2A:
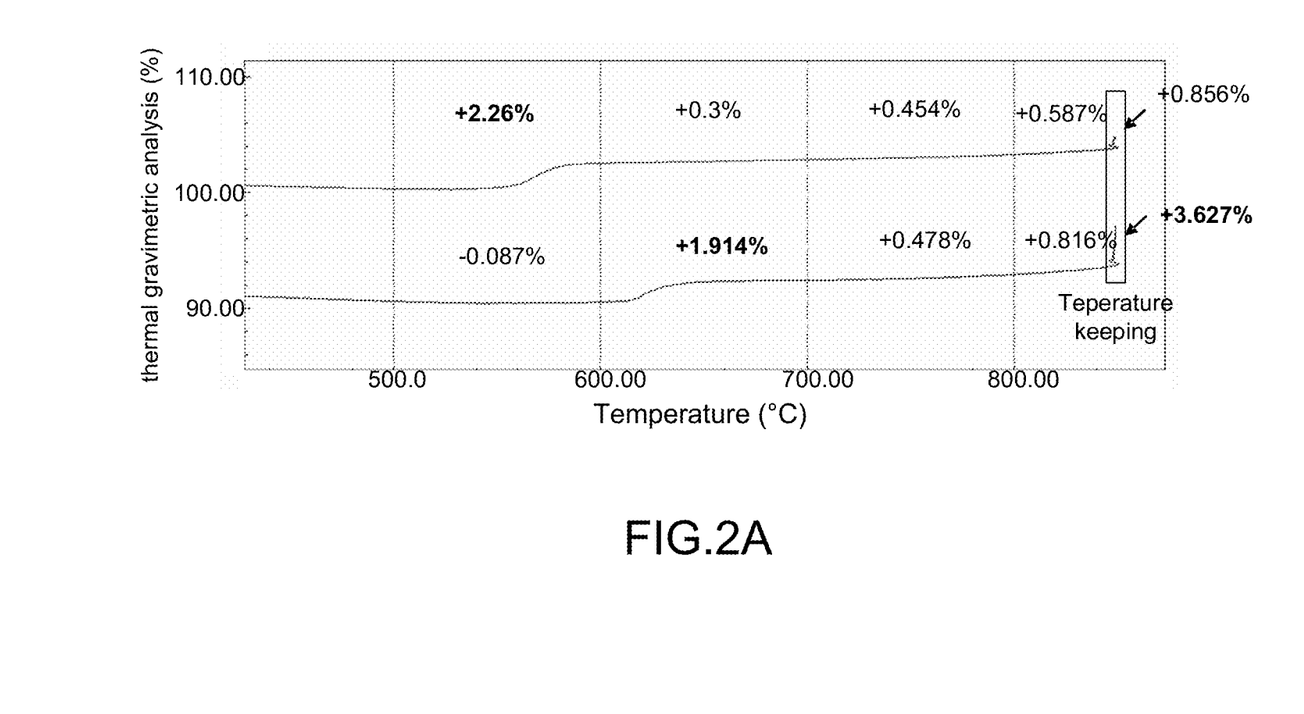
FIG. 2A is the view showing the thermal gravimetric analysis of the big and small particles of the aluminum (Al) powder.
Figure 2B:
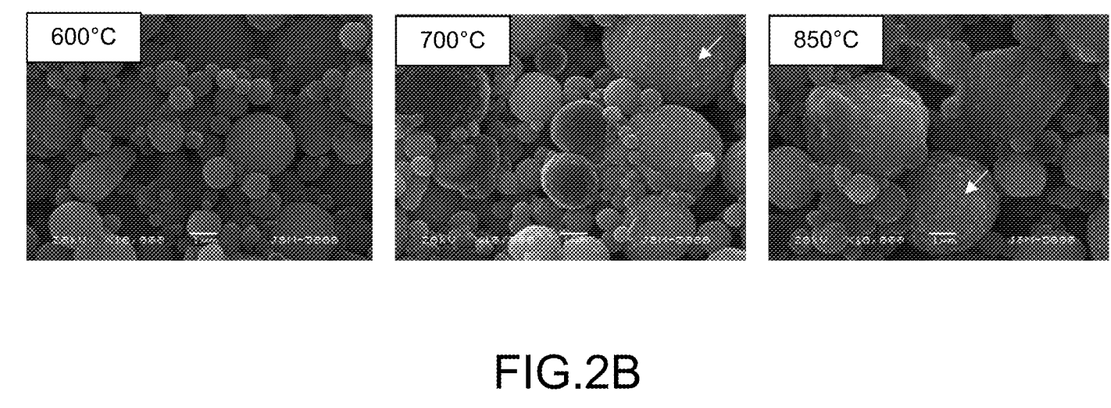
FIG. 2B is the view showing the surface microstructures of the big and small particles of the Al powder.
Figure 3:
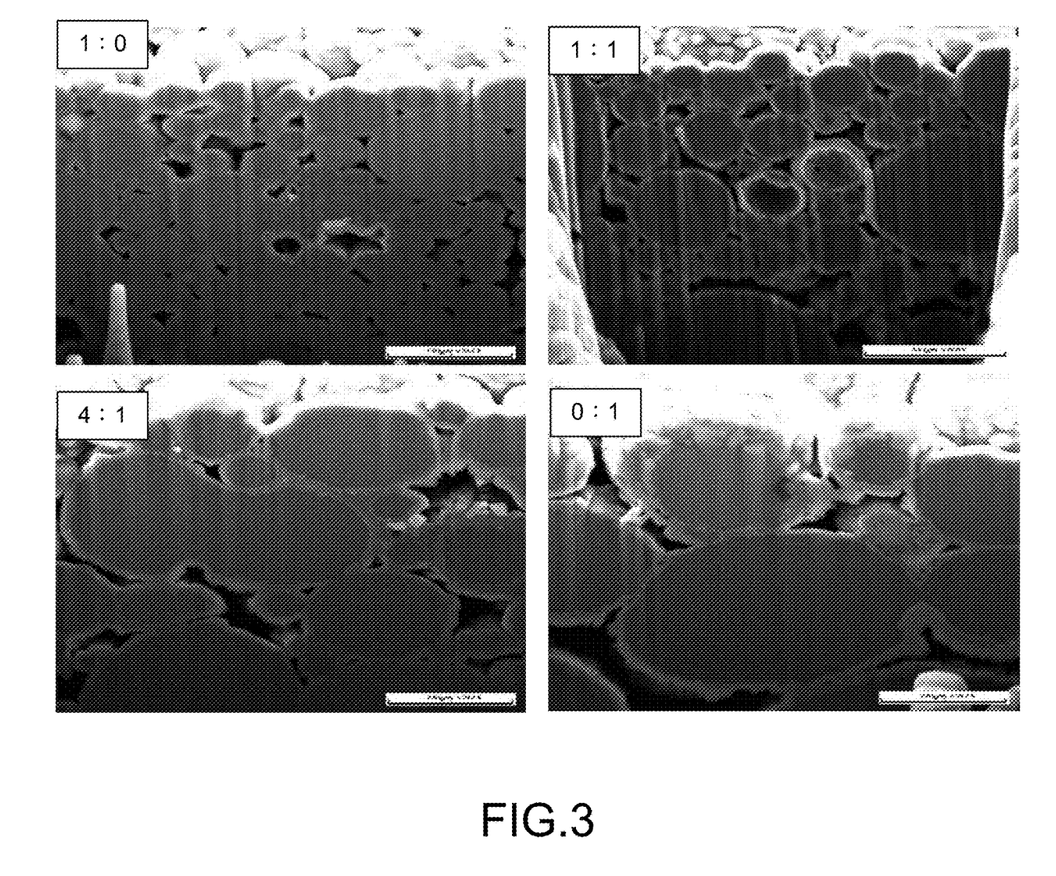
FIG. 3 is the view showing the microstructures of the particles of the Al powder having the different size ratios.
Figure 4A:
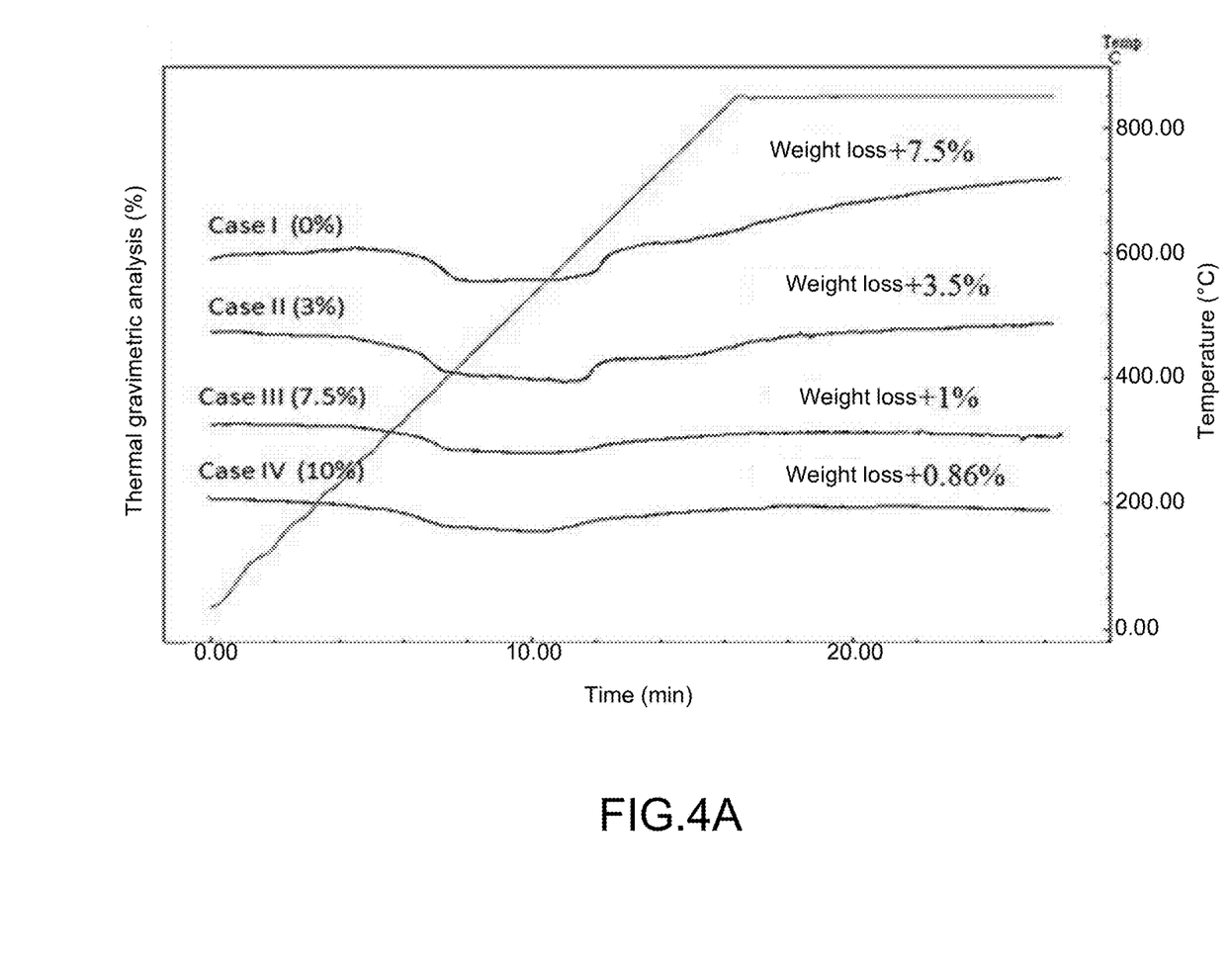
FIG. 4A is the view showing the thermal gravimetric analysis for being added with the different amounts of glass powder.
Figure 4B:
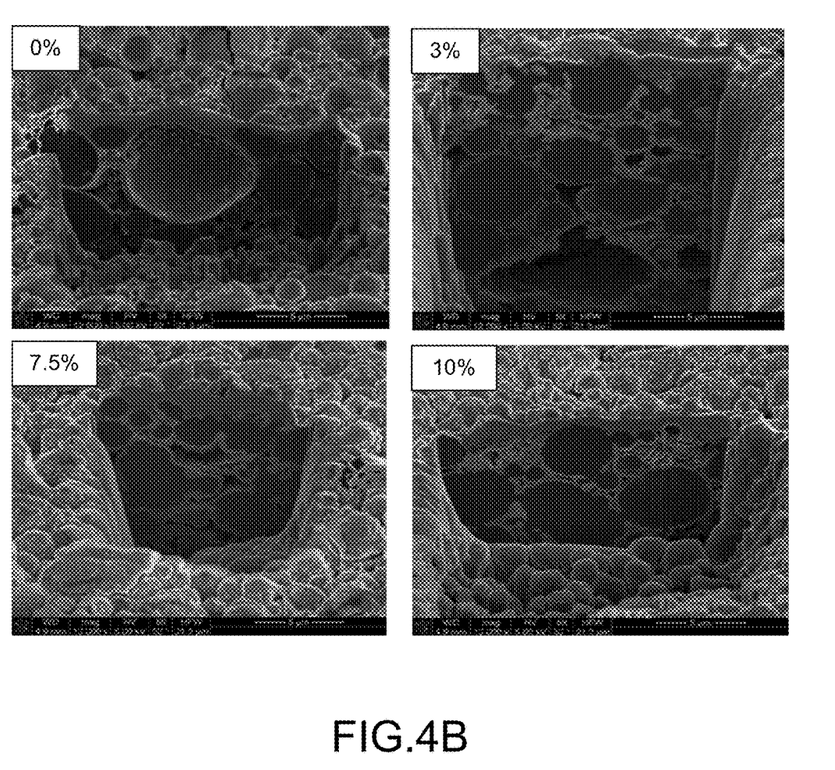
FIG. 4B is the view showing the microstructures for being added with the different amounts of glass powder.

Regarding effect of particle size for the Al powder, the present invention uses thermal gravimetric analysis to observe the degree of oxidation of the big particles and the small particles of the Al powder with mutual reference to scanning electron microscope (SEM) views. As shown in FIG. 2A and FIG. 2B, the big particles have relatively great oxidation at a temperature of 600~700° C. and during a period of holding temperature; and the small particles has no great oxidation after 500~600° C. As referring to SEM views in FIG. 2B, the big particles have bumps on surface. The bumps are formed when the alumina on surface is ruptured after sintering at a temperature above the Al melting point; and, the inner liquid Al immediately flows out to be oxidized. The small particles have no obvious bumps. The above evidence shows that the big particles can be ruptured more easily than the small particles. Consequently, the rupture of the alumina has chance to connect the inner liquid Al. The present invention mainly uses the big particles to form the conductive paths and obtain densification with supplementation of the small particles. In FIG. 3, the density of stacked Al is increased to show sectional microstructure views for the size ratios of big particle to small particle as 1:0, 1:1, 4:1 and 0:1. It obviously shows that no conductive paths will be formed but high resistance will be obtained when the alumina is not ruptured after sintering the small particles. Yet, the big particles will have conductive paths formed when the alumina is ruptured and the adjacent parts of the exposed liquid Al are contacted to form conductive paths with low resistance. According to the resistance and the density of stacked Al, the best size ratio of big particle to small particle is 4:1.

After alumina is ruptured, there must be enough of the liquid glass powder to coat the ruptured surface for inhibiting oxidation and increasing chance of contacting the adjacent parts of the liquid Al during the liquid-phase sintering. Hence, in FIG. 4A, the present invention adds different amounts of the glass powder as 0%, 3%, 7.5% and 10% and uses a thermal gravimetric analyzer to observe the relationship between the added amounts of the glass powder and the oxidation process. By referring to the sectional views shown in FIG. 4B, effect to the microstructures by adding different amounts of the glass powders is observed. By using the thermal gravimetric analyzer, it is observed that, with the increase in the adding amount of the glass powder, the degree of oxidation becomes small; and, after adding 7.5% of the glass powder, almost no significant oxidation happens. As referring to the sectional views of the microstructures, it is found that, without a sufficient amount of the glass powder added, not all of the Al powder is effectively covered and, therefore, the liquid Al flows out to form Al shells. Meanwhile, with too much of the glass powder added, contact area of the liquid Al is limited and high resistivity happens owing to the positive relationship of resistance to contact area. Accordingly, by adding an appropriate amount of the glass powder, not only oxidation is inhibited, but also the chance of contacting the liquid Al is increased while the resistance is significantly reduced. Therefore, the present invention employs the best dosage of the glass powder as 7.5% while the ratio of the Al powder to the glass powder is 10:1.

Figure 5A:
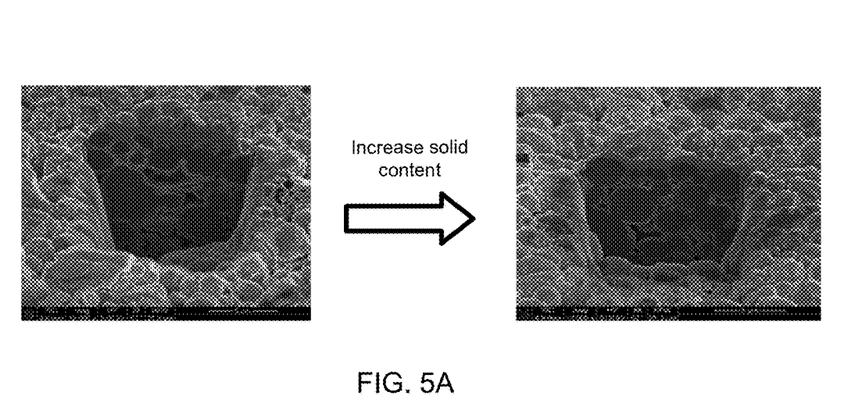
FIGS. 5A and 5B are views showing the microstructures for the matching and mismatching ratios of the Al powder and the glass powder.
Figure 5B:
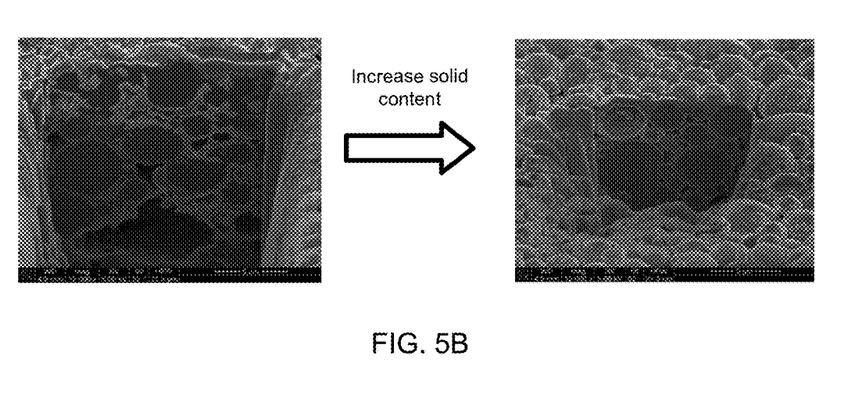

The present invention uses the above conclusion for enhancing solid content. In Table 1, a summary table is shown for recipes, electrical resistances, and sintering temperatures of different Al pastes. In image FIG. 5A, the Al powder has a mismatching content ratio to the glass powder (25:1). Therein, the solid content is increased to obtain a sheet resistance decreased from 13.59 milli-ohms per square (mΩ/sq) to 9.51 mΩ/sq, decreased only about 30%. In FIG. 5B, the Al powder has a matching content ratio to the glass powder (10:1). Therein, the solid content is increased to obtain a sheet resistance decreased from 10.87 mΩ/sq to 4.53 mΩ/sq, effectively decreased about 60%. The result shows the importance of the ratio of the Al powder to the glass powder. Nevertheless, in the cross-sectional microstructures shown in FIG. 5, it shows that, with a matching content ratio of the Al powder to the glass powder, conductive paths are effectively increased with a dense structure formed. Hence, a high-conductivity and low-cost thick-film conductive Al paste is obtained for being sintered in the air.

TABLE 1

| No. | Particle size ratio (big:small) | Al Solid content (wt %) | Glass content (wt %) | Sintering temperature (° C.) | Heating rate (° C./min) | Sheet resistance (mΩ/sq) |
|---|---|---|---|---|---|---|
| 1 | 1:0 | 75% | 3% | 600 | 50 | 68.856 |
| 2 | | | | 650 | 50 | 29.445 |
| 3 | | | | 700 | 50 | 22.9671 |
| 4 | | | | 750 | 50 | 19.932 |
| 5 | | | | 800 | 50 | 20.9739 |
| 6 | | | | 850 | 50 | 21.1098 |
| 7 | 0:1 | 75% | 3% | 600 | 50 | X |
| 8 | | | | 650 | 50 | 1932.815 |
| 9 | | | | 700 | 50 | 351.8451 |
| 10 | | | | 750 | 50 | 214.1331 |
| 11 | | | | 800 | 50 | 107.814 |
| 12 | | | | 850 | 50 | 72.7971 |
| 13 | 1:1 | 75% | 3% | 600 | 50 | 286.4772 |
| 14 | | | | 650 | 50 | 112.0269 |
| 15 | | | | 700 | 50 | 76.4211 |
| 16 | | | | 750 | 50 | 59.8413 |
| 17 | | | | 800 | 50 | 49.2411 |
| 18 | | | | 850 | 50 | 52.2309 |
| 19 | 4:1 | 75% | 3% | 600 | 50 | 58.3011 |
| 20 | | | | 650 | 50 | 27.4971 |
| 21 | | | | 700 | 50 | 22.9671 |
| 22 | | | | 750 | 50 | 19.6149 |
| 23 | | | | 800 | 50 | 19.932 |
| 24 | | | | 850 | 50 | 13.59 |
| 25 | 4:1 | 75% | 0% | 600 | 50 | 108.72 |
| 26 | | | | 650 | 50 | 83.352 |
| 27 | | | | 700 | 50 | 67.95 |
| 28 | | | | 750 | 50 | 42.129 |
| 29 | | | | 800 | 50 | 67.95 |
| 30 | | | | 850 | 50 | 339.75 |
| 31 | | | | 900 | 50 | X |
| 32 | | | | 1000 | 50 | X |
| 33 | | | | 850 | 10 | |
| 34 | | | | 850 | 100 | 338.67 |
| 35 | 4:1 | 75% | 1% | 600 | 50 | 90.6 |
| 36 | | | | 650 | 50 | 58.89 |
| 37 | | | | 700 | 50 | 29.898 |
| 38 | | | | 750 | 50 | 24.009 |
| 39 | | | | 800 | 50 | 21.744 |
| 40 | | | | 850 | 50 | 20.385 |
| 41 | | | | 900 | 50 | X |
| 42 | | | | 1000 | 50 | X |
| 43 | | | | 850 | 10 | |
| 44 | | | | 850 | 100 | 21.385 |
| 45 | 4:1 | 75% | 3% | 600 | 50 | 58.437 |
| 46 | | | | 650 | 50 | 27.633 |
| 47 | | | | 700 | 50 | 23.103 |
| 48 | | | | 750 | 50 | 15.855 |
| 49 | | | | 800 | 50 | 14.496 |
| 50 | | | | 850 | 50 | 13.59 |
| 51 | | | | 900 | 50 | X |
| 52 | | | | 1000 | 50 | X |
| 53 | | | | 850 | 10 | 18.12 |
| 54 | | | | 850 | 100 | 11.778 |
| 55 | 4:1 | 75% | 5% | 600 | 50 | 52.095 |
| 56 | | | | 650 | 50 | 24.915 |
| 57 | | | | 700 | 50 | 16.308 |
| 58 | | | | 750 | 50 | 14.949 |
| 59 | | | | 800 | 50 | 13.59 |
| 60 | | | | 850 | 50 | 12.684 |
| 61 | | | | 900 | 50 | |
| 62 | | | | 1000 | 50 | |
| 63 | | | | 850 | 10 | |
| 64 | | | | 850 | 100 | 12.684 |
| 65 | 4:1 | 75% | 7.5% | 600 | 50 | 20.838 |
| 66 | | | | 650 | 50 | 15.402 |
| 67 | | | | 700 | 50 | 13.59 |
| 68 | | | | 750 | 50 | 13.59 |
| 69 | | | | 800 | 50 | 12.5934 |
| 70 | | | | 850 | 50 | 10.87 |
| 71 | | | | 900 | 50 | 11.32 |
| 72 | | | | 1000 | 50 | X |
| 73 | | | | 850 | 10 | 16.3 |
| 74 | | | | 850 | 100 | 10.42 |
| 75 | 4:1 | 75% | 10% | 600 | 50 | 22.65 |
| 76 | | | | 650 | 50 | 13.59 |
| 77 | | | | 700 | 50 | 12.231 |
| 78 | | | | 750 | 50 | 10.872 |
| 79 | | | | 800 | 50 | 13.59 |
| 80 | | | | 850 | 50 | 11.778 |
| 81 | | | | 900 | 50 | 9.966 |
| 82 | | | | 1000 | 50 | X |
| 83 | | | | 850 | 10 | 20.385 |
| 84 | | | | 850 | 100 | 9.966 |
| 85 | 4:1 | 80% | 3.2% | 600 | 50 | |
| 86 | | | | 650 | 50 | |
| 87 | | | | 700 | 50 | |
| 88 | | | | 750 | 50 | 11.325 |
| 89 | | | | 800 | 50 | |
| 90 | | | | 850 | 50 | 9.51 |
| 91 | | | | 900 | 50 | 11.32 |
| 92 | | | | 1000 | 50 | 13.59 |
| 93 | | | | 850 | 10 | 13.13 |
| 94 | | | | 850 | 100 | 9.06 |
| 95 | 4:1 | 80% | 8% | 600 | 50 | |
| 96 | | | | 650 | 50 | |
| 97 | | | | 700 | 50 | |
| 98 | | | | 750 | 50 | 5.436 |
| 99 | | | | 800 | 50 | |
| 100 | | | | 850 | 50 | 4.53 |
| 101 | | | | 900 | 50 | 5.44 |
| 102 | | | | 1000 | 50 | X |
| 103 | | | | 850 | 10 | 7.61 |
| 104 | | | | 850 | 100 | 4.53 |

Figure 6A:
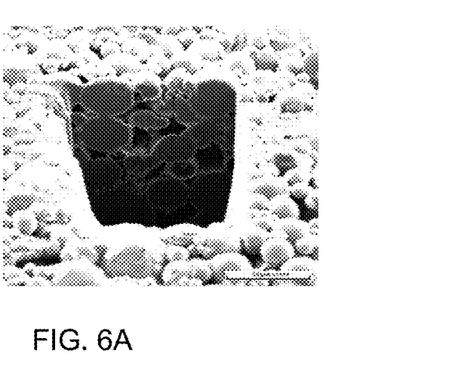
FIGS. 6A and 6B are views showing the microstructures of the conventional Al paste and the novel Al paste fabricated according to the present invention.
Figure 6B:
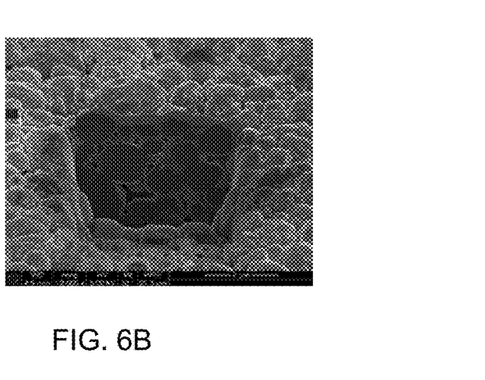
Figure 7:
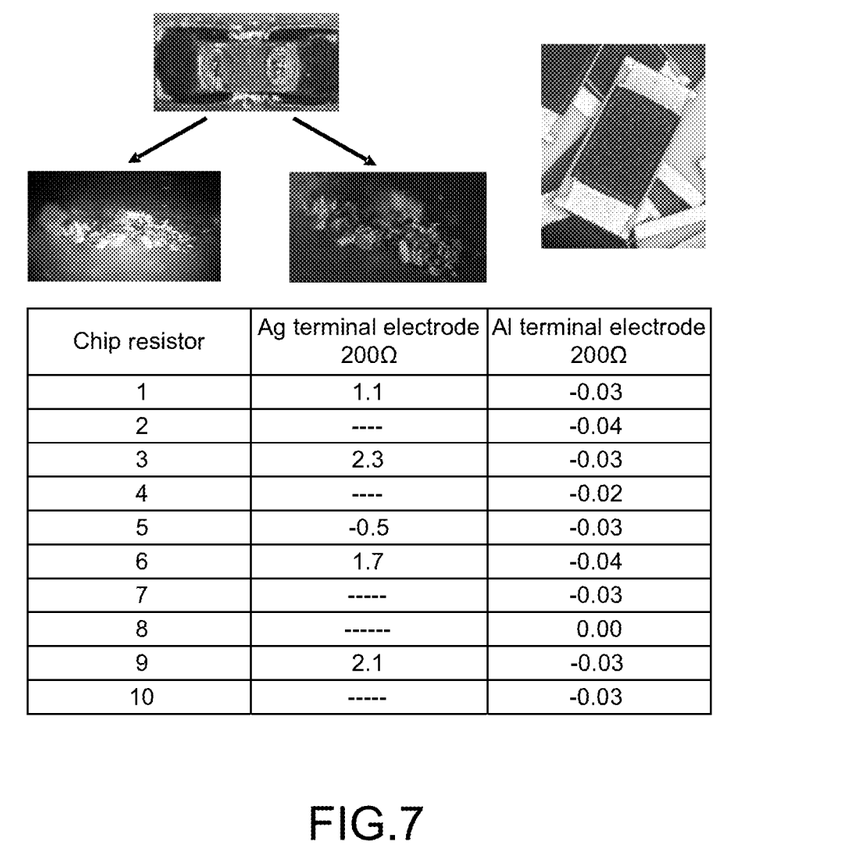
FIG. 7 is the view showing the reliability of the electrodes at the thick-film resistor side to be applied with the novel Al paste in the sulfide tests.

In FIGS. 6A and 6B, images show sectional views of microstructures of the traditional Al paste and the novel Al paste fabricated according to the present invention, respectively. By the difference between the traditional Al paste and the novel Al paste, it shows that the conductive paths are formed between the particles of the novel Al paste with the stacking density significantly improved. Table 2 shows a comparison between the novel Al paste and the other thick-film conductors. As the result shows, the present invention improves low conductivity of the traditional Al pastes. Thus, a low-cost and high-conductivity Al paste is provided for being sintered in the air. Hence, the novel Al paste fabricated according to the present invention can widely replace traditional high-cost Al paste and the copper paste which needs to be sintered in a reducing atmosphere.

TABLE 2

|  | Silver paste | Copper paste | Traditional Al paste | Novel Al paste |
| --- | --- | --- | --- | --- |
| Sheet resistance (Ω/sq) | 3 m | 5 m | ~20 m | 4.53 m |
| Cost | high | low | Low | Low |
| Sintering atm. | air | reducing atm. | air | Air |

The present invention provides a low-cost and high-conductivity thick-film Al paste for being sintered in the air while the production cost of the thick-film resistor can be significantly reduced. On using the present invention for a thick-film resistor terminal electrode, the vulcanization is run under a temperature of 105±2 celsius degrees for a time of 1,000 hours with a saturated sulfur vapor (δF/R<1%). As a result obtained after 1000 hours of a reliability vulcanizing test shows in FIG. 7, the conventional silver terminal electrode reacted with sulfur for forming silver sulfide leads to a resistance as "not available" or severe drifting; and, on the contrary, a high-conductivity Al paste fabricated according to the present invention to be applied in a thick-film resistor Al terminal electrode after 1000 hours of a reliability vulcanizing test leads to a very clean interface. It shows that sulfur is not reacted with Al and the resistance is very stable.

Figure 8A:
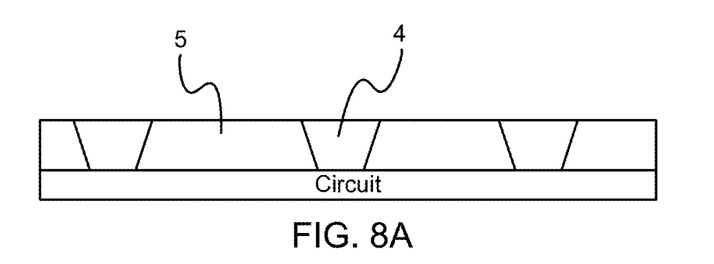
FIGS. 8A and 8B are the structural views showing the applications to pore filling and metallization of the light-emitting diode (LED) ceramic substrate.
Figure 8B:
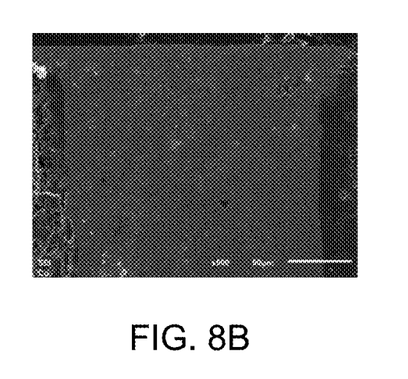

In FIGS. 8A and 8B, the images show applications of the novel high-conductivity Al paste to pore filling and metallization of a light-emitting diode (LED) ceramic substrate. As image FIG. 8B shows, the novel Al paste does not change its size after printing and sintering. Hence, the present invention is particularly helpful for high-precision changes of the pore filling and metallization.

Therefore, as shown in FIG. 6A to FIG. 8B, the present invention uses novel technology to radically solve defects of multiple pores and Al shells with conductivity significantly enhanced for obtaining a high-conductivity and low-cost thick-film conductive Al paste sintered in the air. Thus, the novel thick-film Al paste can be applied to thick-film resistor terminal electrodes; pore filling and metallization of LED ceramic substrates; inner-electrodes and terminal electrodes of passive devices; back conductor pastes of solar cells; and electrode chips on printed circuit boards (PCB).

Accordingly, the present invention has the following technical features and benefits:

1. The purpose of the present invention is to solve the problem of low conductivity of the conventional Al paste by providing a high-conductivity and low-cost thick-film Al paste for being sintered in the air. Therein, the present invention can widely replace the high-cost traditional Al paste and the copper paste which needs to be sintered in a reducing atmosphere.

2. The present invention uses a wide range of particle size distribution and an increased solid content to solve the problem of multiple pores while fully using a rupture mechanism of alumina with sufficient liquid glass powder to improve contacting internal liquid Al with each other to form conductive paths for radically solving the problem of low conductivity of the traditional Al paste.

3. Big Al powder particles can be easily broken to form conductive paths. Small Al powder particles are hard to be broken and easy to fill pores. Therefore, a particle size ratio of 4:1 is obtained for dense-stacking and better conductivity with a concept of mainly using the big particles with coordination of the small particles.

4. In the present invention, after alumina is ruptured, enough of the liquid glass powder is needed to wet all of the Al powder for further inhibiting oxidizing exposed flown-out liquid Al and increasing chances of forming conductive paths. Through thermal gravimetric analysis, the present invention selects a glass powder adding amount of 7.5% for obtaining a best inhibiting effect on oxidation, where the ratio of Al powder to glass powder is 10:1.

5. After obtaining the best particle size ratio and the best ratio of Al powder to glass powder, an equal-ratio increase in solid content results in a dense sheet resistance of 4.53 mΩ/sq—a conductivity close to those of silver paste and copper paste.

To sum up, the present invention is a method of fabricating a high-conductivity thick-film Al paste, where a low-cost and high-conductivity Al paste is provided for being sintered in the air; and the Al paste thus fabricated can widely replace traditional high-cost Al paste and the copper paste which needs to be sintered in a reducing atmosphere.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a high-conductivity thick-film aluminum (Al) paste, comprising steps of:
    (a) providing an Al powder having big particles of sizes of 4-6 μm and small particles of sizes of 1-3 μm and at a ratio of big particles to small particles of 12:1 to 4:3;
    (b) mixing said Al powder with an adhesive and a glass powder to form an intermediate mixture consisting of the glass powder with a solid content in the intermediate mixture of 7.5 wt %, 17.5 wt % of the adhesive, and a solid content of said Al powder in the intermediate mixture of 75 wt %; and
    (c) sintering the intermediate mixture consisting of the Al powder, the adhesive, and the glass powder at a temperature of more than 660 Celsius degrees (° C.), such that the adhesive is burned out to form a sintered thick-film and such that a rupture mechanism of alumina on surfaces of the Al powder exposes liquid Al that is inhibited from oxidation with coordination of a liquid phase of said glass powder on contacting air; wherein adjacent parts of said exposed liquid Al contact with each other to form conductive paths.

2. The method according to claim 1, wherein said sintered thick-film has a sheet resistance less than 5 mΩ/sq.

3. The method of claim 1, wherein the ratio of big particles to small particles is 4:1.

* * * * *